United States Patent
Evans (10) Patent No.: US 10,116,255 B2
(45) Date of Patent: Oct. 30, 2018

(54) CLEANING SYSTEM FOR SOLAR PANELS

(71) Applicant: Solar Maid of Northern of Arizona, LLC, Prescott, AZ (US)

(72) Inventor: James R. Evans, Prescott, AZ (US)

(73) Assignee: SOLAR MAID OF NORTHERN ARIZONA LLC, Prescott, AZ (US)

( * ) Notice: Subject to any disclaimer, the term of this patent is extended or adjusted under 35 U.S.C. 154(b) by 0 days.

(21) Appl. No.: 15/190,054

(22) Filed: Jun. 22, 2016

(65) Prior Publication Data

US 2017/0373633 A1    Dec. 28, 2017

(51) Int. Cl.
| | |
|---|---|
| *H02S 40/10* | (2014.01) |
| *A47L 13/23* | (2006.01) |
| *B25G 1/04* | (2006.01) |
| *B25G 1/10* | (2006.01) |
| *B25G 3/36* | (2006.01) |
| *A46B 5/00* | (2006.01) |
| *A46B 3/02* | (2006.01) |
| *B08B 3/02* | (2006.01) |
| *A46B 11/00* | (2006.01) |
| *A46B 11/06* | (2006.01) |

(52) U.S. Cl.
CPC ............. *H02S 40/10* (2014.12); *A46B 3/02* (2013.01); *A46B 5/0012* (2013.01); *A46B 5/0095* (2013.01); *A46B 11/0072* (2013.01); *A46B 11/063* (2013.01); *B08B 3/024* (2013.01); *B25G 1/04* (2013.01); *B25G 1/102* (2013.01); *B25G 3/36* (2013.01); *A47L 13/23* (2013.01)

(58) Field of Classification Search
CPC ........... A47L 13/22; A47L 13/23; H02S 40/10

USPC ............... 401/137, 282, 284, 286, 287, 289
See application file for complete search history.

(56) References Cited

U.S. PATENT DOCUMENTS

| | | | | |
|---|---|---|---|---|
| 4,200,236 A | * | 4/1980 | Briar | ............... B05B 3/18 15/361 |
| 4,321,419 A | | 3/1982 | Hanafin | |
| 6,935,579 B1 | * | 8/2005 | Lindsey | ............... A47L 13/23 119/604 |
| 7,999,173 B1 | | 8/2011 | Ashpis | |
| 8,057,078 B1 | | 11/2011 | Ko | |
| 8,240,320 B2 | | 8/2012 | Mertins et al. | |
| 8,500,918 B1 | | 8/2013 | Meller et al. | |
| 8,650,693 B2 | | 2/2014 | Singh et al. | |
| 8,771,432 B2 | | 7/2014 | Meller et al. | |
| 8,813,303 B1 | | 8/2014 | Meller et al. | |

(Continued)

*Primary Examiner* — David Walczak
*Assistant Examiner* — Joshua Wiljanen
(74) *Attorney, Agent, or Firm* — Quarles & Brady LLP (57) ABSTRACT

A solar panel cleaning system includes a brush connected by a hose to a fluid supply. The brush has scrubbing material, such as bristles, attached to a brush body for mechanically cleaning the surface of the solar panel. The width of the contact surface of the scrubbing material may be equal to the width of the solar panel, so that the solar panel may be cleaned with only upward and downward strokes. The brush body may further support a fluid manifold that receives the fluid from the fluid supply. The fluid manifold may include nozzles that emit the fluid under pressure onto the solar panel. The nozzles may project both frontward and rearward of the brush body so that the fluid sprays off the solar panel in front of and behind the brush. Spray patterns of the nozzles may overlap and impinge the entire width of the solar panel.

7 Claims, 5 Drawing Sheets

(56) References Cited

U.S. PATENT DOCUMENTS

| | | |
|---|---|---|
| 8,984,704 B2 | 3/2015 | Saraf |
| 9,020,636 B2 | 4/2015 | Tadayon |
| 9,123,845 B2 | 9/2015 | Ashpis |
| 9,126,341 B1 | 9/2015 | Meller et al. |
| 9,130,502 B1 | 9/2015 | Aly et al. |
| 9,157,661 B2 | 10/2015 | Monkman et al. |
| 9,200,818 B2 | 12/2015 | Newdoll et al. |
| 9,243,217 B2 | 1/2016 | Sherlock et al. |
| 2002/0066473 A1 | 6/2002 | Levy et al. |
| 2009/0266353 A1 | 10/2009 | Lee |
| 2009/0288679 A1 | 11/2009 | Pietsch et al. |
| 2009/0288691 A1 | 11/2009 | Hunt et al. |
| 2010/0000570 A1 | 1/2010 | Mertins et al. |
| 2010/0043851 A1 | 2/2010 | Levy et al. |
| 2010/0293729 A1 | 11/2010 | Lee |
| 2010/0300496 A1 | 12/2010 | Souza |
| 2011/0094549 A1 | 4/2011 | Lin |
| 2011/0214246 A1 | 9/2011 | Marshall et al. |
| 2011/0283477 A1 | 11/2011 | Ashpis |
| 2012/0125367 A1 | 5/2012 | Monkman et al. |
| 2012/0152626 A1 | 6/2012 | Gettings et al. |
| 2012/0152627 A1 | 6/2012 | Gettings et al. |
| 2012/0152877 A1 | 6/2012 | Tadayon |
| 2013/0048026 A1 | 2/2013 | Lee |
| 2013/0160794 A1 | 6/2013 | Griffith Cruz et al. |
| 2013/0174888 A1 | 7/2013 | Rogalla et al. |
| 2013/0240004 A1 | 9/2013 | Ho |
| 2013/0240005 A1 | 9/2013 | Ho et al. |
| 2013/0305474 A1 | 11/2013 | Meller et al. |
| 2013/0306106 A1 | 11/2013 | Meller et al. |
| 2014/0007904 A1 | 1/2014 | Shapira et al. |
| 2014/0041138 A1 | 2/2014 | Adler et al. |
| 2014/0041698 A1 | 2/2014 | Adler et al. |
| 2014/0109334 A1 | 4/2014 | Saraf |
| 2014/0150818 A1 | 6/2014 | Chow |
| 2014/0202492 A1 | 7/2014 | Grossman et al. |
| 2015/0047688 A1 | 2/2015 | Gharib et al. |
| 2015/0094247 A1 | 4/2015 | Sherlock et al. |
| 2015/0136196 A1 | 5/2015 | Williamson |
| 2015/0217443 A1 | 8/2015 | Tadayon |
| 2015/0306636 A1 | 10/2015 | Nagura et al. |
| 2015/0326174 A1 | 11/2015 | Ishimura et al. |
| 2016/0015164 A1 | 1/2016 | Bugg |
| 2016/0035912 A1 | 2/2016 | Nair et al. |
| 2016/0048264 A1 | 2/2016 | Elwha |

\* cited by examiner

CLEANING SYSTEM FOR SOLAR PANELS

FIELD OF THE INVENTION

The present disclosure generally relates to cleaning devices for solar panels, and more specifically to water-aided mechanical cleaning systems for solar panels.

BACKGROUND OF THE INVENTION

Photovoltaic cell arrays convert solar energy into electricity. In practice, these arrays are configured for connection to an electrical power grid in what are commonly known as solar panels. An individual solar panel can be quite large: while there is no specific standard size, in the United States the vast majority of solar panels for residential use are about 65 inches tall and about 40 inches wide, and for commercial use are about 77 inches tall and about 40 inches wide. Some custom panels are smaller, and many are larger. Furthermore, solar panels are typically connected in panel arrays to take advantage of the available space at installation. Solar panel arrays can be hundreds of feet long.

The conversion efficiency of a solar panel is affected by many factors, including size, number and composition of cells, materials used in electrical connections, installation and configuration parameters, intensity of incident light, and environmental conditions. Dirt, debris, and other deposits can accumulate on the surface of the solar panel, interrupting and degrading the cells' exposure to the sun. The panels must be cleaned, and owners of large installations typically hire solar panel cleaning professionals to handle the project in an experienced manner. Unfortunately, arrays are often so large that cleaning them is risky even for professionals. Installations are often on roofs high above ground, and may be so tall that the cleaner must walk or otherwise put his body weight directly on the panels to reach the entire panel surface. Additionally, the panel surface can be fragile and very susceptible both to scratching by mechanical cleaning devices, and to etching by cleaning chemicals.

SUMMARY

A solar panel cleaning system that overcomes the aforementioned drawbacks is described herein. In one embodiment, this disclosure provides an apparatus for cleaning a solar panel. The apparatus includes: a brush body having a width approximately equal to the solar panel; a plurality of brush heads each attached to the brush body and having bristles extending away from the brush body, the bristles of each of the plurality of brush heads cooperating to form a contact plane where the bristles contact the solar panel; a fluid manifold attached to the brush body, the fluid manifold comprising one or more pipes interconnecting a plurality of bulkheads; and, a plurality of nozzles each connected to one of the plurality of nozzle bulkheads. Each nozzle bulkhead has attached thereto: a corresponding forward-facing nozzle of the plurality of nozzles, the corresponding forward-facing nozzle extending beyond a front edge of the brush body and emitting pressurized fluid onto the solar panel; and, a corresponding rear-facing nozzle of the plurality of nozzles, the corresponding rear-facing nozzle extending beyond a rear edge of the brush body and emitting pressurized fluid onto the solar panel. The plurality of bulkheads includes a hose bulkhead that connects to a hose to establish fluid communication between the fluid manifold and a fluid supply, and a plurality of nozzle bulkheads in fluid communication with the hose bulkhead.

The contact plane formed by the bristles of the plurality of brush heads may be approximately equal to the width of the solar panel. Each of the plurality of nozzles may emit the pressurized fluid in a fan spray pattern. A corresponding spray pattern of each of the forward-facing nozzles may cooperate with the corresponding spray patterns of the other forward-facing nozzles to impinge the entire width of the solar panel when the bristles are in contact with the solar panel. A corresponding spray pattern of each of the rear-facing nozzles cooperates with the corresponding spray patterns of the other rear-facing nozzles to impinge the entire width of the solar panel when the bristles are in contact with the solar panel. The apparatus may include an adjustable-length handle, and the brush body may include a handle aperture that receives an end of the handle to attach the handle to the brush body.

In another embodiment, the present disclosure provides a solar panel cleaning system that includes: a brush body; scrubbing material configured to scrub dirt and debris from a solar panel to be cleaned, the scrubbing material extending away from the brush body; and a fluid manifold attached to or integral with the brush body, the fluid manifold configured to receive pressurized fluid and emit the pressurized fluid onto the solar panel. The scrubbing material may have a width such that the scrubbing material contacts the solar panel across the entire width of the solar panel. The scrubbing material may comprise a plurality of bristles.

The system may further include one or more brush heads each attached to the brush body, wherein the plurality of bristles is attached to the one or more brush heads. The one or more brush heads may each be removably attached to the brush body, and may be replaceable. The one or more brush heads may be positioned end-to-end in a single row having a width approximately equal to the solar panel width. The fluid manifold may be attached to a top surface of the brush body.

The fluid manifold may include a plurality of nozzles and one or more pipes connected to and delivering pressurized fluid to the plurality of nozzles, the plurality of nozzles each spraying the pressurized fluid downward onto the solar panel. Each of the plurality of nozzles may emit the pressurized fluid in a spray pattern, and the corresponding spray patterns of some or all of the plurality of nozzles may overlap such that the entire width of the solar panel is impinged by the pressurized fluid emitted from the plurality of nozzles. The plurality of nozzles may include one or more forward-facing nozzles that extend beyond a front edge of the brush body to emit the pressurized fluid onto the solar panel. The plurality of nozzles may include one or more rear-facing nozzles that extend beyond a rear edge of the brush body to emit the pressurized fluid onto the solar panel.

The system may further include a hose connected to the brush and in fluid communication with the fluid manifold, and a fluid supply in fluid communication with the hose and delivering fluid to the brush via the hose.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION OF EXEMPLARY EMBODIMENTS

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

The present invention overcomes the drawbacks, mentioned above, of present approaches to cleaning solar panels by providing a solar panel cleaning system including a handheld tool that allows the tool user to apply mechanical scrubbing and a pressurized liquid spray simultaneously along the entire width of a solar panel without subjecting the solar panel to the user's weight. The tool further increases the user's reach to the top of a standard solar panel using an adjustable-length handle. The tool attaches to a supply of liquid for delivering the pressurized liquid. The tool is lightweight and durable and corresponds to a standard solar panel width or to a custom panel width in order to clean the entire panel with only vertical strokes.

Figure 1:
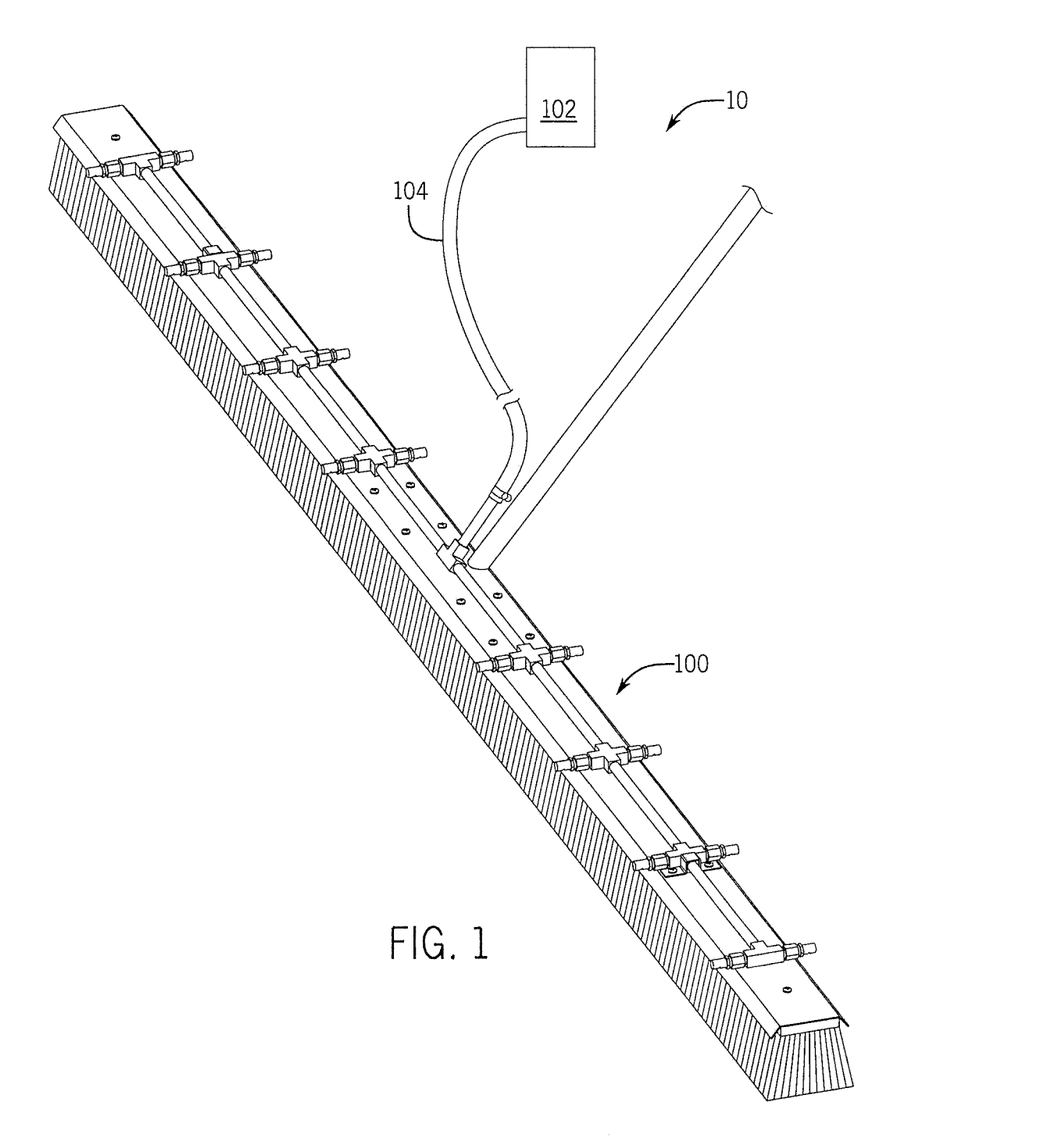
FIG. 1 is a top perspective view of an exemplary embodiment of a solar panel cleaning system in accordance with the disclosure.

Referring now to the figures, FIG. 1 illustrates an exemplary solar panel cleaning system 10 including a brush 100, a fluid supply 102, and at least one hose 104 connecting the brush 100 to the fluid supply 102. The brush 100 is configured to be handheld by a user, and to enable the user to both spray and scrub the surface of a solar panel simultaneously without having to stand, kneel, or balance his body on the solar panel itself. The fluid supply 102 may be any suitable receptacle, tank, piping system, or other source containing the fluid to be delivered. In some embodiments, the fluid may be water; in such embodiments the fluid supply 102 may, for example, be a municipal or private water system. In other embodiments, the fluid may be a cleaning solution of water with soap or other cleaning agents dissolved or suspended therein. A tank or other receptacle may be pressurized and additionally or alternatively may heat or cool the fluid therein. The fluid supply 102 may include a suitable fitting to which the hose 104 attaches.

The hose 104 may be any suitable length and may be flexible or may have a combination of flexible and rigid sections. The hose 104 has a suitable tolerance for environmental conditions and may also be configured to retain the fluid at predetermined fluid pressure and fluid temperature of the system 10. The hose 104 also attaches to the brush 100 at a manifold fitting described below. The hose 104, the fitting between the hose 104 and the fluid supply 102, or another component of the system 10 (e.g., the manifold fitting of the brush 100) may include an injector port and injection device (not shown) for injecting additives, such as soap or non-abrasive cleaning agents, into the fluid line as it travels to the brush 100. The injection may work by Venturi induction, pumping pressure, or another suitable mechanism. In this manner, the fluid supply 102 may contain only water, but the fluid delivered to the brush 100 may be a desired cleaning solution.

Figure 2:
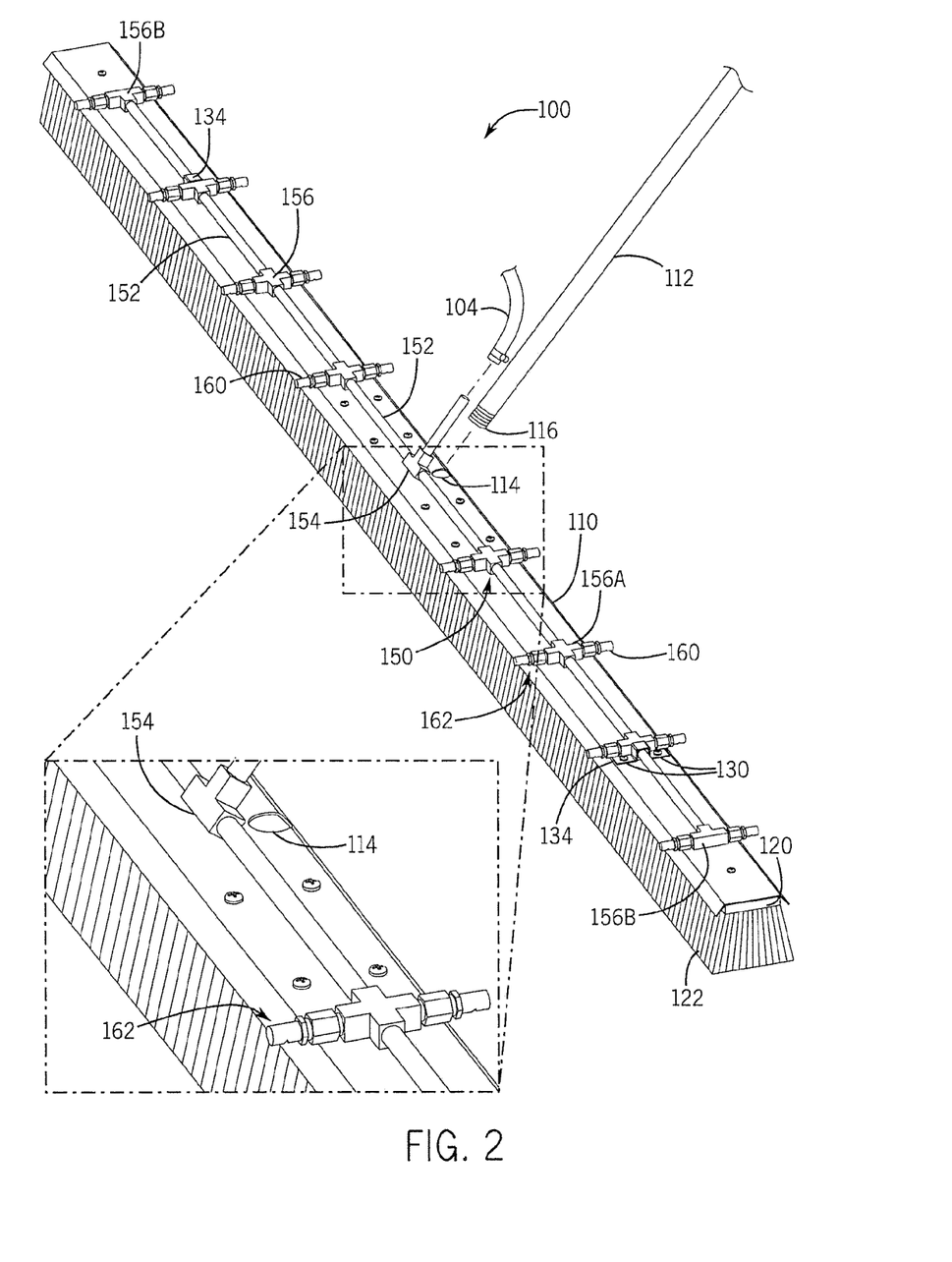
FIG. 2 is a top perspective view of an exemplary brush head of a solar panel cleaning system in accordance with the disclosure.

Referring to FIG. 2, the brush 100 may include a brush body 110 that defines the width of the brush 100 and provides structural support for the other components of the brush 100. The brush body 110 may be a suitably rigid and durable material, such as steel or aluminum (for weight reduction) or a corrosion-resistant polymer. The width of the brush body, which may correspond to a width of a solar panel to be cleaned, may additionally or alternatively be adjustable. A handle 112 may be integral with (e.g., via molding, die cast, thermoforming, or other suitable means according to the materials of the brush body 110 and handle 112) or permanently (e.g., via welds or rivets) or removably attached to the brush body 110. In embodiments of removable attachment, the handle 112 may attach to the brush body 110 with any suitable fastener, friction fit configuration, latch, etc. In some embodiments, the brush body 110 may include a handle aperture 114 substantially near the midpoint, width-wise, and toward the rear of the brush body 110 for receiving and attaching the handle 112. The handle aperture 114 may be threaded, and an end 116 of the handle 112 may be matedly threaded to screw into the handle aperture 114. The handle aperture 114 may bore into the brush body 110 at an angle such that the handle 112 is disposed at an angle with respect to the solar panel that is suitable for cleaning the panel surface. The handle 112 advantageously attached to the middle of the brush body 110 in order to evenly distribute any force applied by a user during a scrubbing action.

The handle 112 may be a suitable cross-sectional shape that accommodates a grip of the user. Typically, the handle 112 is cylindrical and may be made of the same material as the brush body 110, or of a different rigid material. All or a portion of the outer surface of the handle 112 may be corrugated, rippled, or otherwise textured to increase friction against the user's hands. Additionally or alternatively, a grip material may be applied to the outer surface of the handle 112. The handle 112 may have a length suitable for one-handed and/or two-handed use, designed so a user can reach the highest edge of the solar panel. The length may be adjustable by making the handle 112 of telescoping or removable sections. The handle 112 may be solid, or all or a portion of the handle may be hollow for weight reduction, for telescoping/adjusting purposes, and/or to allow the handle 112 to serve as a fluid channel—that is, the interior of the handle can be in fluid communication with the hose 104 and/or with one or more of the nozzle buklheads described below.

Figure 4:
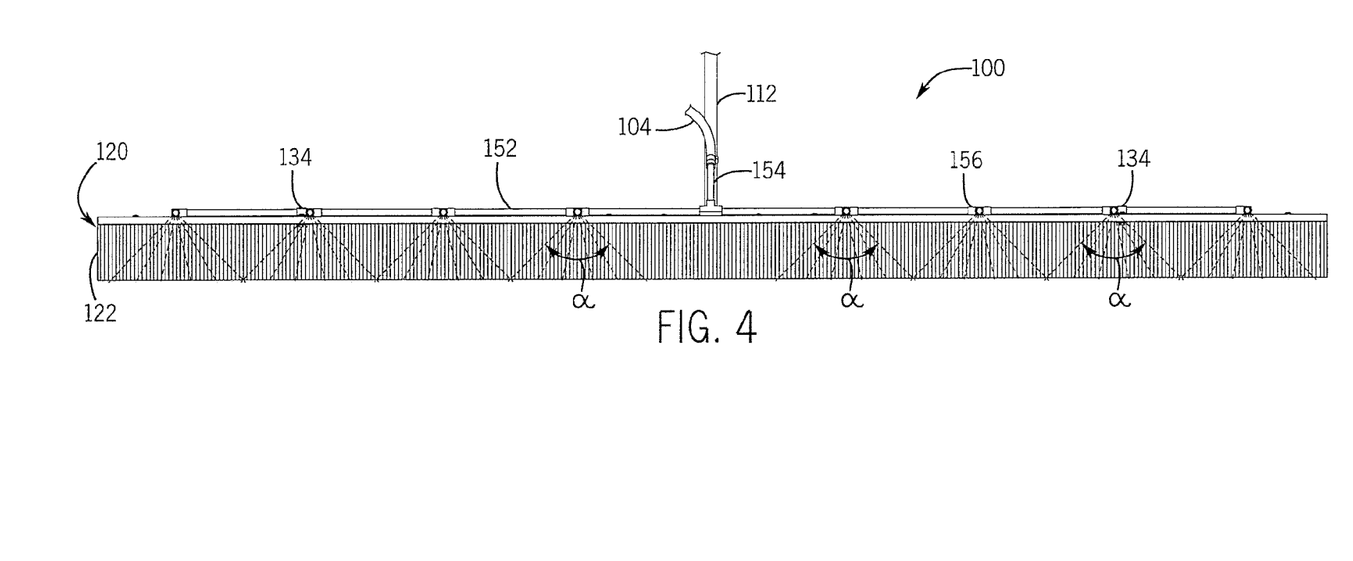
FIG. 4 is a front view of the brush head of FIG. 2.
Figure 5:
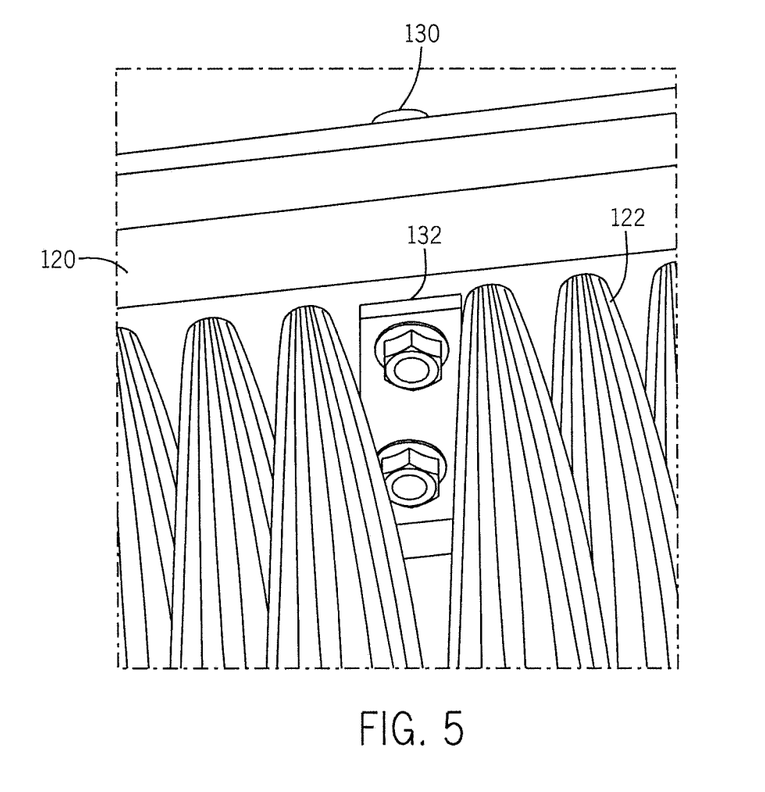
FIG. 5 is a close-up bottom perspective view of a mounting attachment on the brush head of FIG. 2.

As best shown in FIGS. 2, 4, and 5, one or more brush heads 120 may be permanently or removably attached to the brush body 110. Each brush head 120 may have one or more tufts of bristles 122 attached thereto. In one embodiment, a single brush head 120 may be attached to the brush body 110; such a brush head 120 may span all or substantially all of the width of the brush body 110, or may be a predetermined width selected to span the width of a certain type of solar panel (e.g., the brush head 120 may be 40 inches wide, regardless of the width of the brush body 110). In other embodiments, a plurality of brush heads 120 may be attached to and span the width of the brush body 110. The brush heads 120 may abut each other or may be uniformly or non-uniformly spaced apart. The brush heads 120 may be oriented in a single row, as illustrated, or in multiple rows as accommodated by the size of the brush body 110 and the brush heads 120. Advantageously, when multiple brush heads 120 are used, a single damaged or excessively dirty brush head 120 can be replaced, leaving the adequate brush heads 120 intact. Additionally, adjustment of the width of the brush body 110 as described above can be facilitated by removing one or more of the brush heads 120. Another advantage is that existing or standardized brush heads (e.g., for existing cleaning brushes and brooms) may be used in the broom 100, provided the overall width of the brush heads 120 placed end-to-end corresponds to the width of the solar panel(s) to be cleaned.

The Figures illustrate one mechanism for removably attaching the brush head 120 to the brush body 110. One or more fasteners 130 may be disposed through the brush body 110 and the brush head 120. A mounting plate 132 may be used on either or both of the top surface of the brush body 110 and the bottom surface of the brush head 120 (see FIG. 5) to retain the fasteners 130. Advantageously, the fasteners 130 may also attach a bracket 134 for retaining the fluid manifold 150 to the top surface of the brush body 110 as described further below. The reduces the number of fastener bores needed through the brush 100 components. Other attachment mechanisms are contemplated, such as adhesives, brackets, dovetail and other sliding joints, snap connectors, and the like.

In various embodiments, the bristles 122 may be any suitable bristles for cleaning an outdoor environment, and particularly for cleaning scratch-susceptible surfaces such as solar panels. The bristles 122 may be nylon, animal hair, or another suitable material, and may be flocked or unflocked. The bristles 122 may be any suitable length, such as three to four inches extending from the brush head 120. The bristles 122 may attach to the brush heads 120 with a suitable adhesive, friction fit configuration, or other attachment means known in the art. In other embodiments, the bristles 122 may be attached directly to the brush body 110. The bristles 122 cooperate to form a substantially planar contact surface; in operation, the ends of the bristles contact the solar panel surface and surrounding structures and deform, applying mechanical pressure to wipe away contaminants on the solar panel surface.

Figure 3:
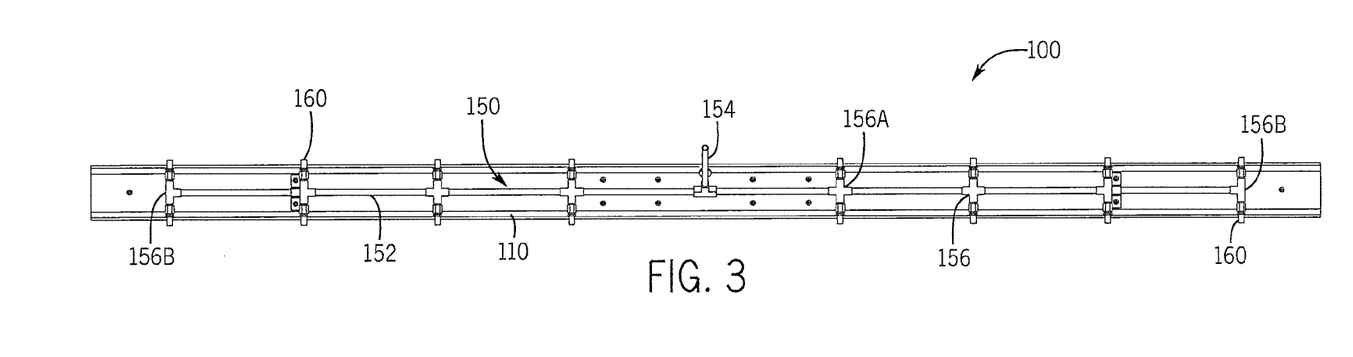
FIG. 3 is a close-up top view of a manifold on the brush head of FIG. 2.

Referring again to FIG. 2, and further to FIGS. 3 and 4, the brush 100 may further include a fluid manifold 150 for delivering the fluid from the brush 100 to the solar panel surface. The components of the fluid manifold 150, described below, may be interconnected with watertight and pressure-sealed connections, and may be made of corrosion-resistant materials such as brass, copper, aluminum, rigid polymer, etc. In one embodiment, the fluid manifold 150 may include a pipe or a series of pipes 152 interconnected in fluid communication with each other by a plurality of bulkheads 154, 156. In other embodiments, the fluid manifold 150 may be an integral component, such as a die-cast metal component. The fluid manifold 150 may be parallel to the major axis (i.e., width-wise) of the brush body 110 and may be generally disposed approximately equidistant from the front and back edges of the brush body 110. The fluid manifold 150 may extend the entire width of the brush body 110, or may be longer or shorter than the brush body 110. The fluid manifold 150 may be secured to the brush body 110 by one or more brackets 134 that prevent lateral and longitudinal shifting of the fluid manifold 150. For example, at least two brackets 134 may each abut one of the bulkheads 154, 156, one on the left side of a bulkhead and one on the right side of a bulkhead, to secure the fluid manifold 150 in place.

A hose bulkhead 154 includes a port for attaching a hose (e.g., the hose 104 of FIG. 1) with a clamp, a fitting, or another suitable hose attachment device. The hose bulkhead 154 also attaches to one or more of the pipes 152, creating a fluid channel between the hose and the fluid manifold 150. In some embodiments, the hose bulkhead 154 may be disposed at about the midpoint of the fluid manifold 150, which may also align approximately with the midpoint of the brush body 110 and with the handle aperture 114. In this configuration, fluid is evenly distributed across the width of the brush body 110. The hose bulkhead 154 may alternatively be located at a different position in the fluid manifold 150, such as at one end of the fluid manifold 150. The end attachment may facilitate the operation of motorized wheels (not shown) that can be attached to the brush body 110 to automate movement of the brush 100. In such embodiments, an additional nozzle bulkhead 156, described below, may be placed at the midpoint of the fluid manifold 150. Additionally or alternatively, the hose bulkhead 154 may be eliminated or integrated with one of the nozzle bulkheads 156, such as by adding a port for hose attachment to the nozzle bulkhead 156 at one of the ends of the fluid manifold 150. Additionally or alternatively, the hose bulkhead 154 may include one or more ports for attaching a corresponding nozzle.

The fluid manifold 150 may further include one or more nozzle bulkheads 156 in various configurations. The nozzle bulkhead 156 includes at least one port for attaching a corresponding pipe 152 to receive fluid in the nozzle bulkhead 156. As illustrated, nozzle bulkheads 156B that are attached at the ends of the fluid manifold 150 may include only one pipe-connection port, while nozzle bulkheads 156A that are not at the ends include two pipe connections to create the fluid channel within the fluid manifold 150. In alternatively embodiments, as described above, the end nozzle bulkhead 156B may have an additional port for connecting the hose, in which case the end nozzle bulkhead 156B may be the same configuration as the other nozzle bulkheads 156A. Each nozzle bulkhead 156 further receives at least one nozzle 160 and delivers fluid to its attached nozzles 160. The nozzle 160 may be attached to the nozzle bulkhead 156 in any suitable watertight fashion, such as by sealed threaded attachment, using a fitting, etc.

Each nozzle 160 extends away from its corresponding nozzle bulkhead 156 to a position where the nozzle 160 can emit pressurized fluid downward (i.e., onto the solar panel) either in front of the brush body 110 or behind the brush body 110. The nozzle 160 may be any suitable atomizing or spray-emitting nozzle. The nozzle 160 may be removably attached to the nozzle bulkhead 156; extending beyond the edge of the brush body 110, the nozzle 160 is easily access for removal and replacement with a new nozzle 160.

As best shown in FIG. 2, the nozzle 160 includes a spray aperture 162 configured to generate a fluid spray pattern with a desired shape and at a desired flow rate. In some embodiments, the nozzle 160 may generate a fan- or sector-shaped spray pattern with a suitable angle. As shown in FIG. 4, in one embodiment, the nozzles 160 are oriented such that the middle of the spray pattern is perpendicular to the solar panel surface, and the spray angle α of adjacent nozzles 160 is selected so that the spray patterns overlap at the ends of the bristles 122 (which define the contact plane described above); thus, the entire width of the solar panel may be impinged by the spray. Various configurations of front-facing and rear-facing nozzles 160 are contemplated; in the illustrated brush 100, corresponding nozzles 160 project forward and rearward of the brush body 110 to create a pressure wash of the solar panel surface that both leads and trails the scrubbing action of the bristles 122, whether the brush 100 is being moved up or down the panel. An additional nozzle 160 attachment may be provided at the midpoint of the brush body 110, as described above, to achieve simultaneous coverage of the entire width of the panel; or, one or more of the bulkheads 156 approximate the middle of the brush body 110 may have an expanded spray field, or may be rotated to adjust the impingement of the corresponding spray.

Figure 6:
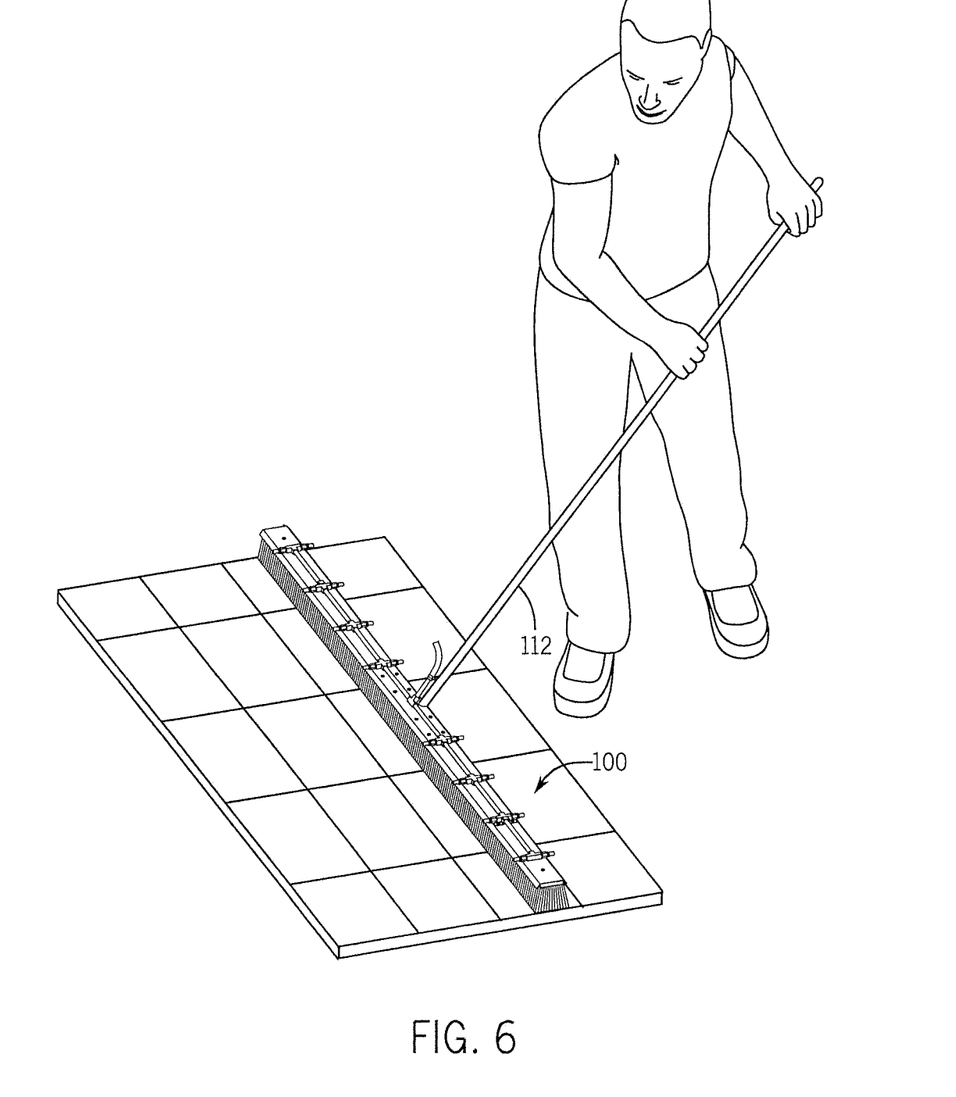
FIG. 6 is a top perspective view illustrating the exemplary brush of the solar panel cleaning system of FIG. 1 in use to clean a solar panel.

In other contemplated embodiments, the fluid transmission manifold may additionally or alternatively be positioned below the brush body 110 or within the brush body 110. However, the illustrated embodiment, having nozzles 160 that spray in front of and behind the brush heads 120 simultaneously, and achieve coverage of the full width of the panel being cleaned (see FIG. 6), has proven most effective for achieving a thorough cleaning action.

The present invention has been described in terms of one or more preferred embodiments, and it should be appreciated that many equivalents, alternatives, variations, and modifications, aside from those expressly stated (e.g., methods of manufacturing, product by process, and so forth), are possible and within the scope of the invention.

What is claimed is:

1. An apparatus for cleaning a solar panel, the apparatus comprising:
   a brush body having a width approximately equal to the solar panel;
   a plurality of brush heads each attached to the brush body and having bristles extending away from the brush body, the bristles of each of the plurality of brush heads cooperating to form a contact plane where the bristles contact the solar panel;
   a fluid manifold attached to the brush body, the fluid manifold comprising one or more pipes interconnecting a plurality of bulkheads, the plurality of bulkheads comprising:
      a hose bulkhead that connects to a hose to establish fluid communication between the fluid manifold and a fluid supply; and
      a plurality of nozzle bulkheads in fluid communication with the hose bulkhead; and
   a plurality of nozzles each connected to one of the plurality of nozzle bulkheads such that each nozzle bulkhead has attached thereto:
      a corresponding forward-facing nozzle of the plurality of nozzles, the corresponding forward-facing nozzle extending beyond a front edge of the brush body and emitting pressurized fluid onto the solar panel; and
      a corresponding rear-facing nozzle of the plurality of nozzles, the corresponding rear-facing nozzle extending beyond a rear edge of the brush body and emitting pressurized fluid onto the solar panel.

2. The apparatus of claim 1, wherein the contact plane formed by the bristles of the plurality of brush heads is approximately equal to the width of the solar panel.

3. The apparatus of claim 1, wherein each of the plurality of nozzles emits the pressurized fluid in a fan spray pattern.

4. The apparatus of claim 1, wherein a corresponding spray pattern of each of the forward-facing nozzles cooperates with the corresponding spray patterns of the other forward-facing nozzles to impinge the entire width of the solar panel when the bristles are in contact with the solar panel.

5. The apparatus of claim 4, wherein a corresponding spray pattern of each of the rear-facing nozzles cooperates with the corresponding spray patterns of the other rear-facing nozzles to impinge the entire width of the solar panel when the bristles are in contact with the solar panel.

6. The apparatus of claim 1, further comprising an adjustable-length handle.

7. The apparatus of claim 6, wherein the brush body comprises a handle aperture.

* * * * *